US008451254B2

(12) United States Patent
Bisutti et al.

(10) Patent No.: US 8,451,254 B2
(45) Date of Patent: May 28, 2013

(54) INPUT TO AN ELECTRONIC APPARATUS

(75) Inventors: Giovanni Bisutti, Cambridgeshire (GB); Simon John Godsill, Linton (GB)

(73) Assignee: InputDynamics Limited, Cambridgeshire (GB)

( * ) Notice: Subject to any disclaimer, the term of this patent is extended or adjusted under 35 U.S.C. 154(b) by 156 days.

(21) Appl. No.: 12/842,777

(22) Filed: Jul. 23, 2010

(65) Prior Publication Data
US 2011/0316784 A1 Dec. 29, 2011

Related U.S. Application Data

(63) Continuation of application No. PCT/GB2009/000224, filed on Jan. 26, 2009.

(30) Foreign Application Priority Data

Jan. 25, 2008 (GB) .................................. 0801396.3

(51) Int. Cl.
*G06F 3/043* (2006.01)
*G06F 3/041* (2006.01)
*G09G 5/00* (2006.01)

(52) U.S. Cl.
USPC ........................... 345/177; 345/156; 345/173

(58) Field of Classification Search
USPC .................................. 345/156–157, 168, 177
See application file for complete search history.

(56) References Cited

U.S. PATENT DOCUMENTS

| 5,854,450 A * | 12/1998 | Kent ........................... 178/18.04 |
| 6,525,717 B1 | 2/2003 | Tang |
| 2001/0003452 A1* | 6/2001 | Linge ........................... 345/179 |
| 2006/0263068 A1 | 11/2006 | Jung |

FOREIGN PATENT DOCUMENTS

| EP | 1517228 | 3/2005 |
| WO | WO 02/03187 | 1/2002 |
| WO | WO 02/27432 | 4/2002 |
| WO | WO 02/088853 | 11/2002 |
| WO | WO 2007/118893 | 10/2007 |

OTHER PUBLICATIONS

Gianfelici, F.; , "A novel touch screen technology based on: stochastic process theory and fuzzy logic approach," Computational Intelligence for Measurement Systems and Applications, 2005. CIMSA. 2005 IEEE International Conference on , vol., no., pp. 181-185, Jul. 20-22, 2005 doi: 10.1109/CIMSA.2005.1522856.*
International Search Report (Form PCT/ISA/210) for corresponding International Application No. PCT/GB2009/000224.
Written Opinion (Form PCT/ISA/237) for corresponding International Application No. PCT/GB2009/000224.

\* cited by examiner

*Primary Examiner* — Sumati Lefkowitz
*Assistant Examiner* — Jonathan Horner
(74) *Attorney, Agent, or Firm* — Billion & Armitage; Benjamin C. Armitage

(57) ABSTRACT

An electronic device, comprising a processing system; a sensor for detecting vibrations caused by a user striking the device and outputting a signal indicative of a parameter of those vibrations; wherein the processing system is configured to analyse the signal output from the sensor and determine a parameter related to the location of the strike. Other methods and systems for making inputs to electronic devices are also described.

16 Claims, 13 Drawing Sheets

INPUT TO AN ELECTRONIC APPARATUS

CROSS-REFERENCE TO RELATED APPLICATIONS

The present application is a continuation of PCT/GB2009/000224, filed Jan. 26, 2009, which claims priority to GB Patent Application No. 0801396.3, filed Jan. 25, 2008, which are incorporated by reference for any purpose.

The present invention relates to electronic apparatus.

BACKGROUND ART

Electronic apparatus, such as handheld electronic devices can comprise a display screen, a keypad for control and data entry purposes and one or more pointing devices.

Conventionally the user of handheld electronic devices relies on the use of pointing devices to interact more effectively, within the limitation of the relatively small display screen available, with the host of applications available such as, to mention a few, web browsing, emailing, SMS, word processing, spreadsheet and games.

Pointing devices enable the user to interact with the application running on the handheld electronic device by moving the cursor within the display area in a desired position for instance to select commands, follow links, drag shapes and objects or input text.

There are a variety of pointing devices such as for instance touch screens which detect the position of a stylus or a finger on the display area, joy sticks, arrow buttons, and buttons with a four way swivel which depending on the tilt move the cursor on the screen along four orthogonal directions, track balls or jog dials.

The touch screen, amongst the above mentioned pointing devices, provides the handheld device user with the most intuitive and efficient interface. However due to comparatively higher costs compared to other pointing devices, touch screens tend to be incorporated only in medium to high end specification products.

A first need requiring addressing is therefore the provision of a more cost effective touch screen solution which may find particular application in entry level to medium specification products.

Within each application there are some commands which are used most often than others such as for instance the ENTER function, scrolling down or scrolling up, scrolling left or scrolling right, zooming in or zooming out, moving back or moving forward web pages, moving page up or moving page down, undo and redo command and many others.

The speed of selection of these most common commands depends on the type of pointing device being used and the skill of the user.

When using a computer keyboard the most common commands can be accessed generally quicker by using either keyboard keys or keyboard short cuts consisting of a simultaneous press of 2 or 3 keys, rather than by using the pointing device; especially if the command is nested within one or two levels of, submenus.

For instance, in Windows applications, page up within a document may be accessed using the "Page up" key on the keyboard or undo the latest command may be accessed by pressing simultaneously the "CTRL" and "Z" keys.

On a small keypad of an electronic handheld device some keys such as the "Page up" and "Page down" keys may not be not provided due to lack of space and the simultaneous pressing of 2 or 3 keys is a cumbersome operation.

A second need requiring addressing is therefore the provision of better ways of quickly selecting or implementing commands similar to that provided by computer keyboards.

The most common arrangement for a conventional handheld electronic device such as a mobile phone is the provision of the display screen above the keypad.

The limitation of this design is that the size of both the display screen and the keypad is reduced as they are sharing the same surface area on the device.

A first solution to this problem is to adopt a configuration similar to a computer laptop by providing the display screen on one half of the device, the keypad on the other half of the device and a hinged mechanism between the two halves, with the axis of the hinge parallel to one of the sides of the screen, thus enabling to achieve within the same footprint of a conventional phone a considerable increase of the size of both the display screen and the keypad.

With this configuration, sometimes referred to as flip configuration, when the device is not in use, the flip is folded covering the display screen and when in use the flip can be opened and rotated usually up to 180 degree around the hinge presenting the display screen and the keypad to the user.

The added benefit of this configuration is that the display screen is protected when the device is not in use as the flip is folded over.

The drawback of this configuration is that for certain uses of the device, such as for example watching a video stream, the user does not need the keypad once the selection of the media to be played has been made and therefore the half of the phone housing the keypad becomes temporarily a hindrance.

A second to the problem in conventional handheld electronic devices of the display screen and keypad sharing the same area is to conceal the keypad underneath the display screen when not needed and to present the keypad to the user when needed by providing either a sliding mechanism between screen and keypad halves or a rotating mechanism between the two with the rotation axis perpendicular to the screen.

A drawback of this second configuration is that the display screen is always exposed to the risk of damage from scratches and abrasion.

A third need requiring addressing is therefore the provision of a solution addressing the limitations of both the flip design configuration and the slide configuration in handheld electronic devices providing display screen on one half of the device and the keypad on the other half.

Design constraints, such as the small size of handheld devices can necessitate the inclusion of a keypad with fewer keys than a conventional QWERTY keyboard. The provision of all the letters of the alphabet can be achieved by using some or all of the keys of the keypad to select more than one letter of the alphabet.

The composition of text messages on mobile telephones highlights the shortcomings in the use of a keypad with a limited number of keys. The mobile telephone user composes a text message by entering the component letters of the alphabet on a keypad. Typically, the keypad has a limited number of keys, e.g. twelve to fifteen, since the keypad is primarily provided for the entry of telephone numbers. Accordingly, there can be fewer keys available on the keypad than letters of the alphabet.

A known solution to this problem is the use of each key to enter one of two or more different letters of the alphabet. For example, the number 9 key might be associated with the characters 'w', 'x', 'y' and 'z'. Normally, the number of consecutive key-presses within a set time interval determines which of the available characters is selected. For example, one key press selects 'w' and four key presses selects 'z'. This mode of operation is often termed a multi-tapping input mode.

However, the multi-tapping input mode has drawbacks. Clearly, the approach can require a significant number of key-presses to compose anything other than the shortest of text messages. For example, entry of the word "hello" can require the user to type 44, 33, 55, 55, 666, thus involving eleven key presses instead of six. Under certain circumstances, e.g. prolonged use, a user can develop repetitive strain injury (RSI).

A reduction of the number of key-presses can be achieved by the arrangement disclosed in WO 02/27432A2. According to WO 02/27432A2, the keypad comprises a limited set of letter entry keys and each letter entry key can be used to enter one of several letters of the alphabet. An auxiliary key is provided on the keypad for selecting which one of the letters is to be entered upon operation of one of the letter entry keys.

The present applicant has realized that the arrangement of WO 02/27432A2 can have drawbacks. Both the auxiliary key and the letter entry keys of WO 02/27432A2 are of a pushbutton type and thus can predispose the user to RSI. In addition, the arrangement of WO 02/27432A2 can be inconvenient to use, in that operation of the auxiliary key can be incompatible with one-handed operation and in certain circumstances can be difficult even with two-handed operation.

A fourth and last need requiring addressing is therefore the provision to the user of handheld electronic devices of ways of reducing the amount of multi-tapping required when inputting text.

SUMMARY OF THE INVENTION

Modern electronic handheld devices such as mobile phones handsets may feature a high degree of processing power and memory resources which are already utilized in many models to improve the man-machine-interface by enabling the user for instance to impart commands to the handset with the voice through the already present input acoustic sensor, the microphone.

An underlying principle of this invention is the exploitation of existing resources within the handset such as processing power, memory and the microphone to provide the user with the additional capability of entering characters or imparting commands by tapping, striking, sliding and other physical actions on areas of the handset such as for instance the casework, display screen and keypad with no or minimal addition of parts and therefore costs to the handset.

For instance the addition of a fairly inexpensive vibration sensor might detect other features outside the acoustic frequency spectrum deriving from the user tapping, striking, sliding and other physical actions on the handset, such features enhancing the reliability of the acoustic/vibration user interface.

Accordingly, from a first aspect of the present invention there is provided an electronic apparatus comprising: a keypad comprising a plurality of input keys, at least one of which is operable by a user to enter one of two or more different characters, and a user controllable selector for selecting which one of the two or more different characters is to be entered before, during or after the key is operated by the user, characterized in that the selector is provided separately from the keypad.

Providing the selector separately from the keypad can make for good ergonomic design. For example, the selector might be located for operation with the user's thumb and the input keys located separately from the selector for operation with the user's fingers.

The selector may be liable to operation by one physical action and the input keys liable to operation by another, dissimilar physical action.

More specifically, the selector may comprise an actuator of one kind and the input keys comprise an actuator of another different kind, thereby making the selector and input keys liable to operation by dissimilar physical actions. For example, one actuator might comprise an electromechanical device, such as a pushbutton switch and the other actuator comprise a purely electronic device, such as a touch screen switch element.

Alternatively or in addition, the selector may have a configuration of one kind and the input keys have a configuration of another different kind, thereby making the selector and input keys liable to operation by dissimilar physical actions. For example, one device might be a pushbutton switch and the other a rotary switch. However, whatever the difference between the input keys and selector the difference should be such that the input keys and selector can be operated by dissimilar physical actions.

Operation of the input key and the selector by dissimilar physical actions can lessen the damage sustained by the user's fingers and hands, thereby reducing the likelihood of RSI. For example, where the keypad is of a type comprising pushbuttons, the selector might be a rotatable knob. The dissimilar physical actions involved in operating the input keys and the rotatable knob can reduce the likelihood of repetitive strain in comparison with, for example, the arrangement of WO 02/27432A2, which requires the use of a pressing action to operate both the letter entry keys and the auxiliary key. Furthermore, operation by means of dissimilar physical actions according to the present invention can make for greater ease of use.

The selector and input keys may be operable by dissimilar physical actions selected from the group consisting of pressing, tapping, touching, rotating, tilting, twisting, sliding and uttering.

In addition, the selector may be of a non-pushbutton type.

Alternatively or in addition, the selector may be operable to cycle through the two or more different characters. For example, where the two or more different characters are 'x', 'y'$^{ar}$>d 'z\ a first operation of the selector changes the selected character from 'x' to 'y', a second operation of the selector changes the selected character from 'y' to 'z' and a second operation of the selector changes the selected character from 'z' back to 'x'.

The selector may comprise a component ordinarily present on the electronic apparatus and a detector for detecting a user selection made by movement of the component. For example, if the electronic apparatus is a mobile telephone the component might be one or more of a microphone stalk, a pivotable keypad cover or an aerial.

Alternatively or in addition, the selector may be operable to make a selection by being moveable to one of two or more positions corresponding to the two or more different characters. For example, the sensor might be a switch.

Alternatively or in addition, the selector may be operable by non-manual means, i.e. by means other than the hands of a user. For example, the selector may comprise a microphone that is responsive to a user's voice. According to this example, the selection of one of the two or more different characters can be made in response to an utterance.

Alternatively or in addition, the selector may comprise a sensor, which is responsive to a physical action of a user to select one of the two or more different characters. In one form, the sensor may be responsive to the orientation of the electronic apparatus, e.g. a tilt sensor. In another form, the sensor may be responsive to a striking by the user of different parts of the electronic apparatus. For example, the sensor might be a vibration sensor and the striking of the different parts of the electronic apparatus might set up vibrations of different frequencies, each of which is operative to select one of the two or more different characters. The vibration sensor may be a discrete component, or another component, for example, the microphone or speaker, could be used to provide that functionality.

The two or more different characters may comprise characters of a writing system, e.g. letters of a Latin-based alphabet or ideographs such as Chinese symbols. For example, where the different letters are 'w', 'x', 'y' and 'z', the selector can be used to select the 'z' character. Thus, according to this example, a user has merely to use the selector and perform a single operation of the key to enter the 'z' character.

In addition, the keypad may comprise fewer input keys than there are characters in the writing system. For example, the keypad might be of a kind suitable for the input of numeric data and thus have a fewer keys, e.g. 12 to 15, than there are letters of a western alphabet, e.g. a keypad meeting the requirements of ISO/IEC 9995-8 1994.

Alternatively or in addition, the two or more different characters may comprise control characters. The control characters might be for causing the electronic apparatus to carry out different functions. For example, if the electronic apparatus is a television remote control the different control characters might be for selecting one of a plurality of television channels.

The electronic apparatus may comprise a hand-held device, e.g. a mobile telephone, Personal Digital Assistant (PDA), pager, video camera, camera, Games console, remote control, or satellite navigation receiver.

In an application of the present invention, the electronic apparatus may be operable by a user to enter text. For example, the electronic apparatus might be a mobile telephone and the keypad and selector operable by a user to compose a text message.

According to an embodiment of the present invention the selector may be configured to vibrate in a predetermined manner upon being struck by a user and may further comprise a sensor operative to produce a signal in dependence on the vibration of the selector. The sensor may be specifically for this purpose, or a sensor provided primarily for a different purpose could be utilised. The selector may be a specific element of the device, or the entire, or part, of the device may be configured as the selector. The striking could therefore be performed in any defined area of the device.

A user can make a selection by striking, e.g. tapping, the selector. The tapping of the selector can induce a vibration, which causes the sensor to produce a signal that is used to make the selection.

The selector may be operable to select one of two or more different characters by striking the selector in one of two or more different ways. For example, a first part of the selector might be tapped to induce a vibration with a first characteristic and a second part might be tapped to induce a vibration with a second characteristic. According to this example, the first and second characteristics may select respectively the letters 'a' and 'b'.

The vibration of the selector can cause the emission of a tone having a characteristic corresponding to the manner of vibration. Thus, the selector may be operative to emit a tone and the sensor may be an acoustic sensor operative to detect the emitted tone. For example, the acoustic sensor might be a microphone.

The characteristic of the tone may be one or more of quality, pitch or volume.

Alternatively or in addition, the sensor may be a vibration sensor which is operative to detect the vibration of the selector.

The selector may comprise a panel element of a predetermined thickness, shape, size or material, the manner of vibration of the selector being dependent on the predetermined thickness, shape, size or material.

In addition, the selector may comprise a plurality of panel elements, each of which is of a different thickness, shape, size or material, whereby each panel element is operative to vibrate in a different manner corresponding to a plurality of selection functions.

More specifically, the panel element may be comprised of one or more of a single material, a composite or a sandwich.

Alternatively or in addition, to reduce the power consumption related to both the acoustic sensor tone detection and the associated processor signal recognition, the handheld electronic apparatus might be comprised of a user controllable switch capable of switching on and off the sensor and associated signal recognition depending on whether the selector is used or not; and of an automatic switch-off facility capable of switching the sensor off following a predetermined period of inactivity of the selector.

Alternatively or in addition the handheld electronic apparatus might be comprised of an acoustic sensor capable of being switched on as a result of the vibration sensor producing a signal following the detection of the vibration of the selector and of an automatic switch-off facility capable of switching off both the acoustic sensor tone detection and the associated signal processing following a predetermined period of inactivity of either the vibration sensor or the acoustic sensor.

From a second aspect of the present invention there is provided a method of selecting a character for entry into an electronic apparatus, comprising: providing an electronic apparatus comprising a keypad, which comprises a plurality of input keys, and a user controllable selector, operating one of the input keys to enter one of two or more different characters, and selecting by means of the selector before, during or after the step of operating one of the input keys which one of the two or more different characters is to be entered, characterized by providing the selector separately from the keypad.

It is to be appreciated that the method according to the second aspect of the invention may include any one or more of the features described above with reference to the first aspect of the invention.

The applicant has realized that the embodiment described above, i.e. configuring the selector to vibrate when struck by a user, can have wider application.

Therefore according to a third aspect of the present invention, there is provided a keypad for electronic apparatus, comprising: at least one input key operable by a user to enter a character, characterized in that the input key is configured to vibrate when struck by a user, and further comprising a sensor operative to produce a signal, in dependence on vibration of the input key.

The input key may be configured to vibrate in a predetermined manner. Thus, a user can enter a character, such as the letter 'a' by striking, e.g. tapping, the input key. The tapping of the key can induce a vibration, which causes the sensor to produce a signal that is representative of the character.

The input key may be configurable by the user during an initialization procedure. Alternatively or in addition, the input key may be configurable during manufacture. This feature can help prevent another party from eavesdropping on the user of the invention by allowing the user or manufacturer to change the correspondence between the emitted tones and the characters.

The input key may be operable to enter one of two or more different characters by striking the key in one of two or more different ways. For example, a first part of the key might be tapped to induce a vibration with a first characteristic and a second part might be struck to initiate a vibration with a second characteristic. According to this example, the first and second characteristics may represent respectively the letters 'a' and 'b'.

Alternatively or in addition, the keypad may comprise a plurality of input keys each of which is configured to vibrate in a predetermined and different manner to enable different characters to be entered by a user. For example, a first input key might vibrate at a first frequency, which corresponds to the letter 'a' and a second input key might vibrate at a second frequency corresponding to the letter 'b'.

The input key may comprise a panel element of a predetermined thickness, shape, size or material, the manner of vibration of the key being dependent on the predetermined thickness, shape, size or material.

In addition, the keypad may comprise a plurality of panel elements, each of which is of a different thickness shape, size or material, whereby each panel element is operative to vibrate in a different manner corresponding to a different character.

More specifically, the panel elements may be integrally formed in one panel.

In addition, a panel element may be comprised of one or more of a single material, a composite or a sandwich.

The keypad may comprise at least two input keys each of which is operable by a user to enter a different character, at least two sensors, which are spaced apart from each other, and a processor; and the processor may be operative to determine which of the input keys has been struck based on the times-of-flight of the vibrations between the struck key and the two sensors.

Thus, when a user strikes one of the input keys, e.g. the key that enters the character 'a', the vibrations emanating from the key can be detected by each of the sensors. Each sensor can produce an output signal and the output signals can be used by the processor to determine that the 'a' key has been struck based on the time taken for the vibrations to reach each sensor.

More specifically, the processor may be operative to determine differences in the times-of-flight of the vibrations between the struck key and the two or more sensors, the differences in times-of-flight being indicative of the struck key. For example, when the vibrations reach a first sensor, the first sensor's output signal might be used by the processor to activate a timer. When the vibration reaches a second sensor, its output signal can be used to stop the timer, to thereby provide a measure of the time difference. It is to be appreciated that this approach can be applied to arrangements comprising more than two sensors.

In addition, the keypad may comprise a plurality of input keys and at least three sensors, two of the input keys being substantially equidistant from two of the sensors, and in which the three sensors are spaced apart from and out of line with each other, whereby the processor may be operative to determine which of the plurality of input keys has been struck based on the times-of-flight of vibrations between the struck key and each of the three sensors.

According to such an arrangement, the processor can be provided with sufficient time-of-flight information to discriminate between the equidistant keys. For example, where the keypad is rectangular in outline three sensors might be located towards each of three corners of the keypad.

Alternatively or in addition, the processor may be a microprocessor.

The vibration of the input key can cause the emission of an acoustic output having a characteristic corresponding to the manner of vibration. Thus, the input key may be operative to emit a tone and the sensor may be an acoustic sensor operative to detect the emitted tone. For example, the acoustic sensor might be a microphone.

In the embodiment described hereinabove in which the input key is configured to vibrate in a predetermined manner, a predetermined characteristic of the tone may be one or more of quality, pitch or volume.

Alternatively or in addition, the sensor may comprise a vibration sensor which is operative to detect the vibration of the input key.

According to another embodiment of the present invention there is provided electronic apparatus comprising a keypad according to the third aspect of the invention.

According to a further embodiment of the present invention there is provided a hand-held device comprising a keypad according to the third aspect of the invention.

In addition, the handheld device may comprise one or more of a mobile telephone, PDA, pager, video camera, camera, Games console, remote control and satellite navigation receiver.

It is to be appreciated that the third aspect of the invention may include any one or more of the features described above with reference to the first aspect of the invention and vice versa.

According to a fourth aspect of the invention, there is provided a method of entering a character or selecting a command, comprising: providing a keypad for electronic apparatus, with at least one input key operable by a user to enter a character, characterized by configuring the input key to vibrate when struck by a user, and by providing a sensor operative to produce a signal, which is representative of the character, in dependence on the vibration of the input key.

It is to be appreciated that the method according to the fourth aspect of the invention may include any one or more of the features described above with reference to the third aspect of the invention.

According to a fifth aspect of the invention, there is provided a method of entering a character or selecting a command, comprising: providing an electronic apparatus, with at least one input key or input area operable by a user to enter a command, characterized by configuring the input key or area to vibrate when struck by a user, and by providing a sensor operative to produce a signal, which is representative of the command, in dependence on the vibration of the input key or area. The input key or input area may vibrate according to the general design of the device, or the key or area may be designed to vibrate in a predetermined manner. The sensor may produce the representative signal directly, or it may produce a signal which indicates a characteristic of the signal for analysis by another component. For example, the sensor may detect the frequency of vibration, which frequency is utilized by another component to identify the input key or area.

Alternatively or in addition the vibration of the input key or area can cause the emission of a tone having a characteristic corresponding to the manner of vibration. Thus, the input key or area may be operative to emit a tone and the sensor may be an acoustic sensor operative to detect the emitted tone. For example, the acoustic sensor might be a microphone.

The characteristic of the tone may be one or more of quality, pitch or volume.

According to a sixth aspect of the invention, there is provided a method of selecting an input key or area, comprising: providing a electronic apparatus, with at least one input key or input area operable by a user to enter a character or a command, characterized by configuring the input key or area to both vibrate and emit a tone when struck by a user, and by providing a vibration sensor operative to produce a signal in response to the vibration detected which is operative to switch on an acoustic sensor operative to detect the emitted tone. For example, the acoustic sensor might be a microphone.

It is to be appreciated that the method according to the sixth aspect of the invention may include any one or more of the features described above with reference to the fifth aspect of the invention.

According to a seventh aspect of the invention, there is provided a electronic, apparatus comprising a keypad connected to the main body with one hinge mechanism connected in turn to a second hinge mechanism thus allowing the keypad to be positioned either over one face of the main body housing the display screen or over the opposite face.

Alternative or in addition the keypad may be provided with a transparent area enabling the user to see all or part of the display screen when the keypad is position over the display screen itself.

It is to be appreciated that the method according to the seventh aspect of the invention may include any one or more of the features described above with reference to the other aspects of the invention.

According to an eighth aspect of the invention there is provided a mobile phone handset comprising:

one or more input keys or areas located on the display screen, the edges, the keypad, the keypad buttons and or other surfaces of the apparatus, operable by a user to enter a character or command;

each input area producing an unique acoustic signature when struck by the user, due to either a purposefully designed asymmetric internal layout of the handset internal components such as PCB connectors and others, or to variation in design features such the thickness, material, shape and other mechanical properties of the various input areas;

one or more acoustic sensors within the casework picking up the unique acoustic signature of the input area struck by the user;

a GSM baseband chipset digitizing the signal and feeding through the audio processing circuits residing on the Mixed signal processor, Physical processor, and Applications Framework;

the audio processing including but not limited to sampling, noise cancellation, echo cancellation, equalization and filtering to extract>a "clean signal" for the recognition phase;

the apportion of the clean signal to a specific area of the casework taking place by using as an example two signal processing methodologies in combination such as "Signal model based methods" and "Feature analysis";

the simplest "Model-based signal classification methods" expressing the characteristics of the clean signal as a stochastic process model having different parameters for different tapping positions and different styles of tapping, where the model is based on templates learned from training data from the handset in question and the classification of the clean signal takes place according to which, if any, of the templates is a closest match using basic multi-class matched filtering technology;

more sophisticated "Model-based signal classification methods" expressing the characteristics of the clean signal as a stochastic process deriving from standard autoregressive model as used in linear predictive coding (LPC) of speech, or from ARMA models, or from nonlinear time series models if necessary with careful consideration for the driving excitation noise to the models, where the model is based on templates learned from training data from the handset in question and the classification of the clean signal takes place according to which, if any, of the templates is a closest match using techniques such as maximum likelihood or Bayesian detection;

the "Feature Analysis" providing compensation for different striking implements such as finger, pen, stylus and others or environmental factors such as temperature, humidity and others or drift over time by first processing the clean signal using "Fourier transforms", "linear predictive coding (LPC)" or other feature extraction techniques and then attempting to classify the features using classifiers such as Bayesian classification, neural networks or support vector machines rather than trying to find an exact or near-exact match between the clean signal and previously stored templates;

the unique 'code' generated within the Applications Framework corresponding to the input area struck being interpreted by the User Interface as it would a keypress from a traditional keypad or a selection from a touch screen;

color coded input areas being provided on the casework or the keypad which enable the quick selection of items such as web page hyperlinks displayed on the screen by the handset user interface with a set of matching colors to the ones used on the casework or keypad;

the user being able to select areas or implement commands on the display screen by striking two or more input areas at the same time, for instance zooming in by striking at the same time with the thumb and the index finger the opposite corner of a particular area of the display screen;

the function of the input area being either marked on the casework next to the input area or on the input area itself, or displayed on the edge of the screen in the proximity of the input area, or beneath the input area in the case of the input area being located in the screen area, or displayed in any area of the screen with a leader leading to the input area, or shown on a customization window for the user to customize and remember;

the user being able to manually calibrate or to initiate a semi-automatic calibration procedure of the input areas in case of reduction of the reliability of the recognition process.

It is to be appreciated that the method according to the eighth aspect of the invention may include any one or more of the features described above with reference to the other aspects of the invention. Furthermore, the method and apparatus according to the eighth aspect of the invention may not include all of the features identified in the above description, but may include only a subset of those features while providing the general function described in relation to the eighth aspect of the invention.

According to a ninth aspect of the present invention, there is provided a handheld device having means for detecting continuous finger, stylus or other implement sliding movement gestures along a predetermined direction, comprising:

a strip with three or more contour features (protuberances, depressions or surface textures) each with similar acoustic properties and placed along the strip at a gradually varying spacing so that the sliding of the finger, stylus or other implement in one direction produces a succession of similar signals (for example tones or vibrations) at an increasing frequency and the sliding in the opposite direction produces a succession of similar signals at a decreasing frequency, such an increase or decrease of frequency being a measure of whether the user is sliding the finger, stylus or other implement in one direction or the opposite one;

alternatively or additionally the strip having two or more contour features (protuberances or depressions) placed along the strip, each feature with different acoustic properties so that the sliding of the finger, stylus or other implement in one direction produces a succession of different signals (for example tones or vibrations) according to the placing of the contour features and, the sliding in the opposite direction produces a succession of different signals according to the placing of the contour features in reverse order, the order or reverse order of different signals being a measure of whether the user is sliding the finger, stylus or other implement in one direction or the opposite one;

alternatively the strip having regular contour features or surface textures which are rougher when the sliding of the finger, stylus or other implement takes place in one direction and comparatively smoother when the sliding takes place in the opposite direction the resulting two different signals (for example tones or vibrations) produced being a measure of the direction of sliding the finger, stylus or other implement along the strip;

the increase or decrease of the frequency of similar signals being detected by a sensor (for example an acoustic sensor) producing an output signal which in turn is used by the processor to implement either a command or the opposite one such as for instance scroll left or scroll right, scroll up or scroll down, zoom in or zoom out, volume up or volume down and others;

both the function of the strip and the association of one command with one direction and the opposite command with the opposite direction being either factory set or customizable by the user depending on the application running on the device;

the function of the strip being either marked on the casework next to the strip or displayed on the screen in the vicinity of the strip itself as a function or as a cursor or both;

within the same application running on the device the strip having multiple functions togglable by the user;

strip being either integral part of the casework or a user replaceable insert.

It is to be appreciated that the method according to the tenth aspect of the invention may include any one or more of the features described above with reference to the other aspects of the invention. Furthermore, the method or apparatus of the tenth aspect may not include all of the features described with reference to that aspect, but may include only subset while still providing the general function of that aspect.

According to an eleventh aspect of the present invention, there is provided a handheld device having means for detecting continuous finger, stylus or other implement sliding movement gestures along several directions, comprising:

a pad with a matrix of at least three by three contour features (protuberances or depressions) each with similar acoustic properties and placed on the pad at a gradually varying spacing in two preferably orthogonal directions so that the sliding of the finger, stylus or other implement in any direction produces a succession of similar signals (for example vibrations or tones) at a specific varying frequency dependent on that direction; the succession of similar signals at a specific varying frequency being detected by an acoustic sensor producing an output signal which in turn is used by the processor either to implement a movement of the pointer or to pan the screen content along that direction. The succession of signals may be unique to a given direction; the pad being either integral part of the casework or a discrete component. For example the pad may be a user attachable pad, which can be attached and replaced by the user.

It is to be appreciated that the method according to the eleventh aspect of the invention may include any one or more of the features described above with reference to the other aspects of the invention. Furthermore, the method or apparatus of the eleventh aspect may not include all of the features described with reference to that aspect, but may include only subset while still providing the general function of that aspect.

The methods described herein may be performed by firmware or software in machine readable form on a storage medium. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF DRAWINGS

Specific embodiments of the present invention will now be described, by way of example, and with reference to the accompanying drawings in which.

DETAILED DESCRIPTION OF DRAWINGS

Figure 1:
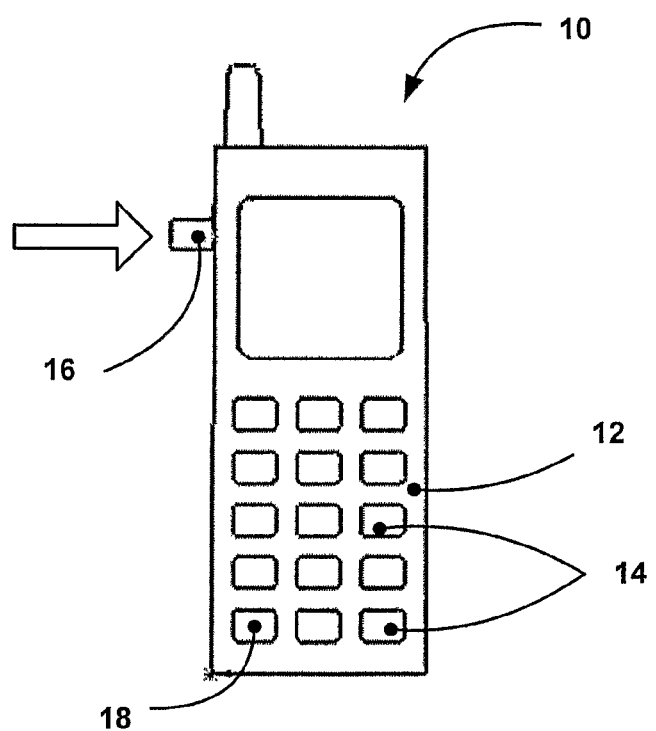
FIG. 1 is a front view of a mobile telephone.

FIG. 1 shows a front view of a mobile telephone 10 comprising a keypad 12, input keys 14, which are of a kind other than pushbuttons, e.g. discrete areas on a touch screen, and a pushbutton 16 (which constitutes a selector). One or more 18 of the input keys is operable by a user to enter one of two or more different letters of an alphabet, e.g. 'w', 'x', 'y' and 'z'.

FIGS. 2 to 14 show alternative embodiments of the keypad 12 and selector 16 of FIG. 1. The embodiments of FIGS. 2 to 14 have the same components as the mobile telephone of FIG. 1, except where otherwise stated.

Figure 2:
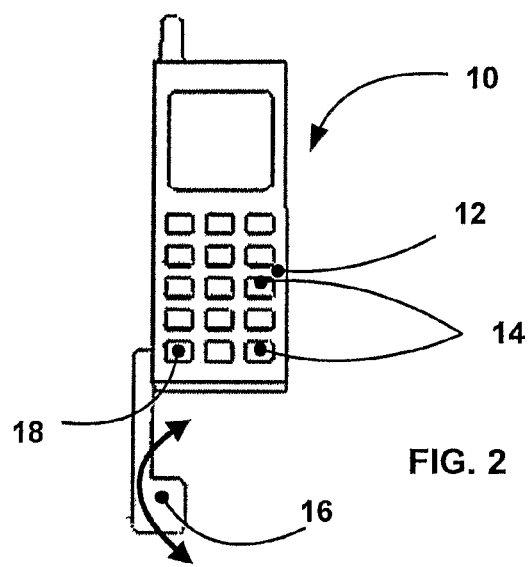
FIGS. 2 to 15 show alternative embodiments of the selector and/or input keys of a mobile telephone.

The mobile telephone of FIG. 2 has a twistable microphone 16 (constituting a selector), which twists in the manner indicated by the arrows.

Figure 3:
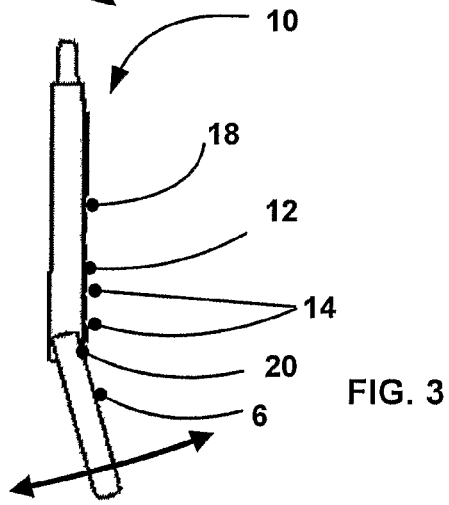

FIG. 3 shows a mobile telephone in profile. The mobile telephone of FIG. 3 has a microphone 16 (constituting a selector), which pivots in the manner indicated by the arrows. In addition, the microphone comprises a detector 20 for detecting a selection made in accordance with the position of the microphone. The keypad 12 has input keys 14 in the form of pushbuttons.

Figure 4:
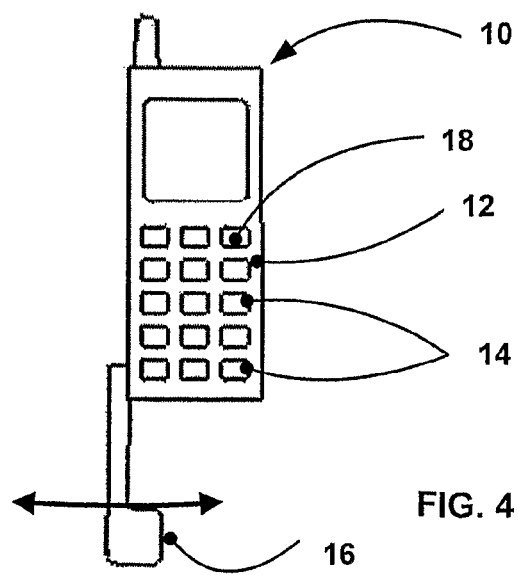

The mobile telephone of FIG. 4 has a microphone 16 (constituting a selector), which can be moved in the direction shown by the arrows to make a selection. In addition, a detector (not shown) detects a selection made in accordance with the position of the microphone.

Figure 5:
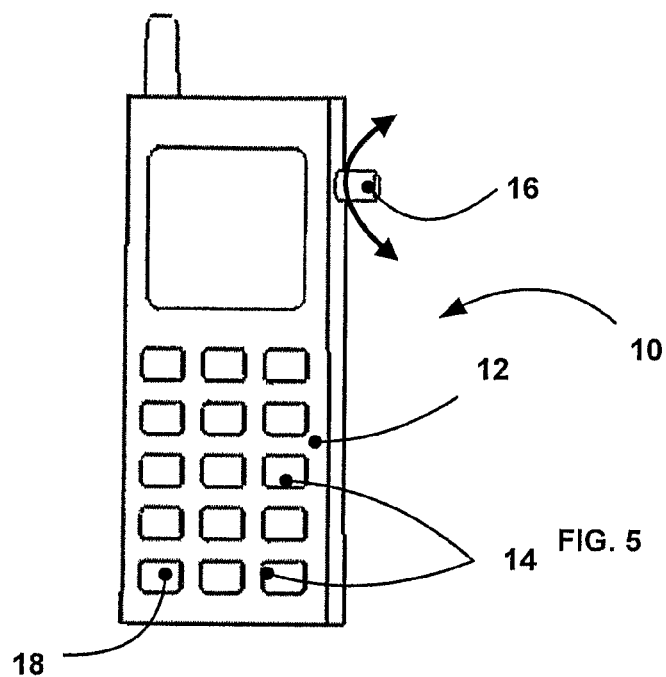

The mobile telephone of FIG. 5 has a rotatable button 16 (constituting a selector), which can be rotated in the direction shown by the arrows to make a selection. The input keys 14 of the keypad are pushbuttons.

Figure 6:
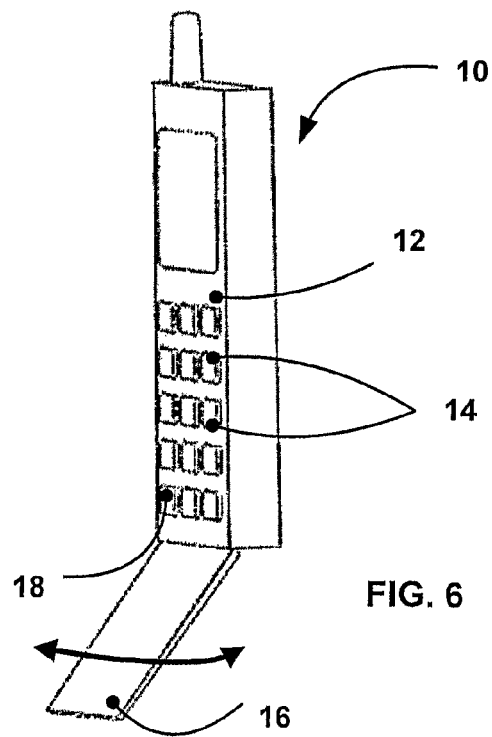

The mobile telephone of FIG. 6 has a pivotable keypad cover 16 (constituting a selector), which can be pivoted in the manner indicated by the arrows to make a selection. In addition, a detector (not shown) detects a selection made in accordance with the position of the keypad cover. The input keys 14 of the keypad are pushbuttons.

Figure 7:
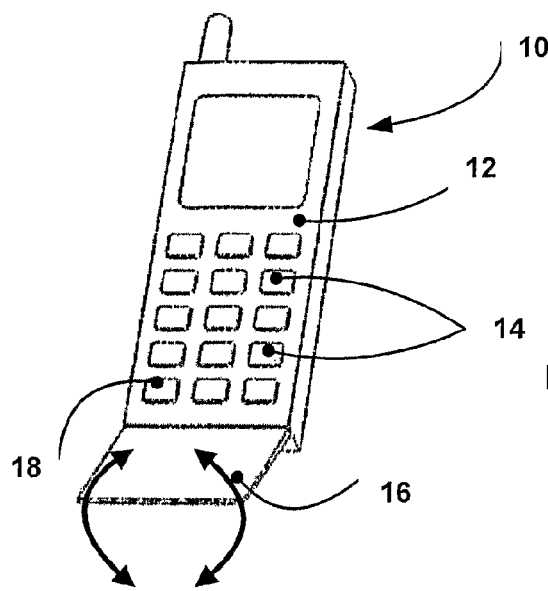

The mobile telephone of FIG. 7 has a twistable keypad cover 16 (constituting a selector), which can be twisted in the manner indicated by the arrows to make a selection. In addition, a detector (not shown) detects a selection made in accordance with the position of the keypad cover.

Figure 8:
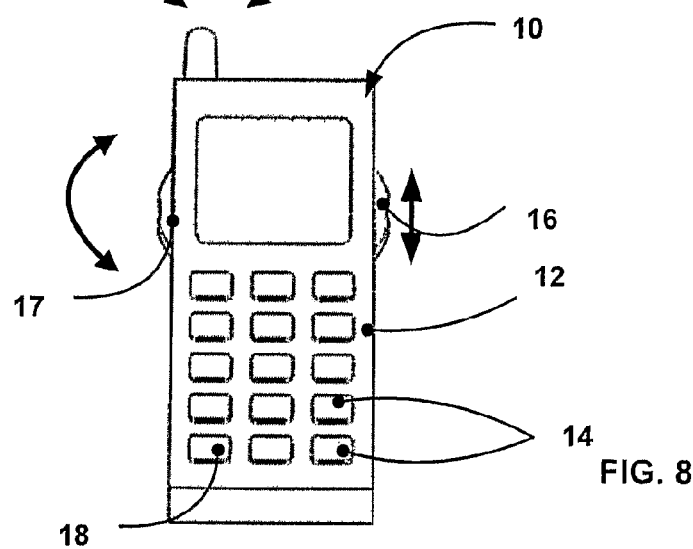

The mobile telephone of FIG. 8 has a slider arrangement 16 or a rotatable wheel 17 (each of which individually or in combination constitutes a selector), each of which can be moved in the manner indicated by the arrows to make a selection.

Figure 9:
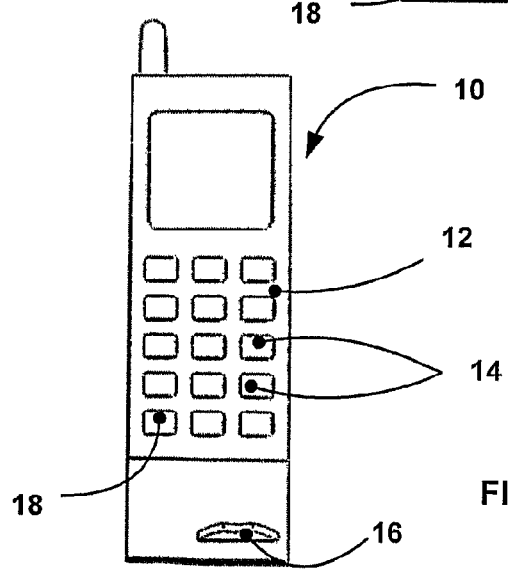

The mobile telephone of FIG. 9 has a microphone 16, which is ordinarily present on the mobile telephone, and which constitutes a selector. The microphone is responsive to different sounds produced by a user tapping on different parts of the mobile phone. One of the two or more different characters is selected in accordance with the different sounds sensed by the microphone.

Figure 10:
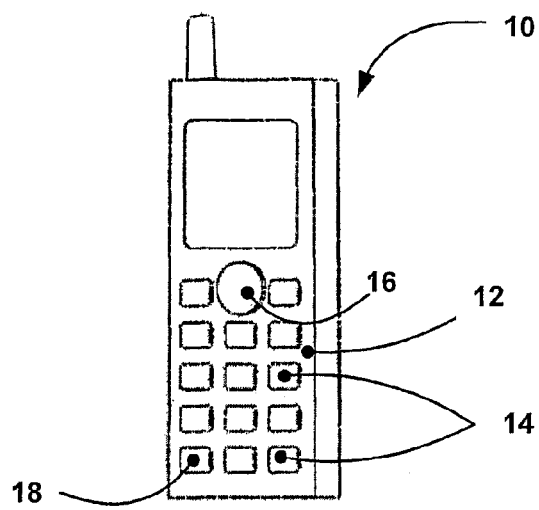

The mobile telephone of FIG. 10 has a microphone (not shown), which is ordinarily present on the mobile telephone, and which constitutes part of a selector. An input pad 16 constitutes the remaining part of the selector and is configured to have a plurality of areas each of which produces a different sound in response to being tapped by a user. The selection of one of two or more different characters is made in accordance with the sound produced by the input pad and sensed by the microphone.

Figure 11:
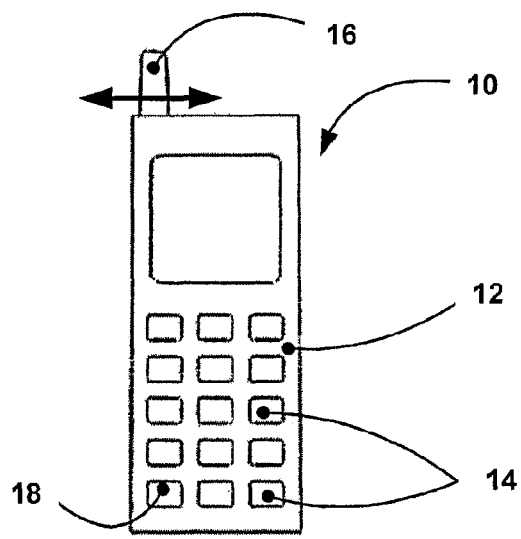

The mobile telephone of FIG. 11 has a pivotable aerial 16 (constituting a selector), which can be pivoted as indicated by the arrows to make a selection. In addition, a detector (not shown) detects a selection made in accordance with the position of the aerial.

Figure 12:
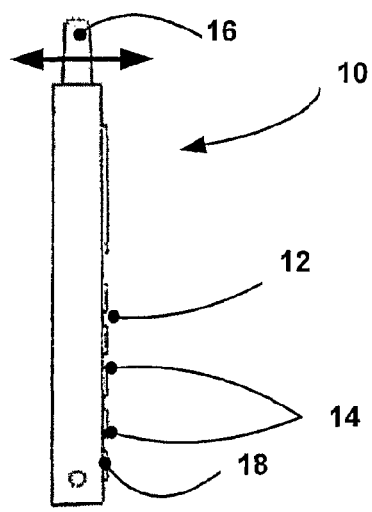

FIG. 12 shows a mobile telephone in profile. The mobile telephone of FIG. 12 has a pivotable aerial 16 (constituting a selector), which pivots in the manner indicated by the arrows, i.e. in a direction substantially perpendicular to that of FIG. 11. In addition, a detector (not shown) detects a selection made in accordance with the position of the aerial. The input keys 14 of the keypad are pushbuttons.

Figure 13:
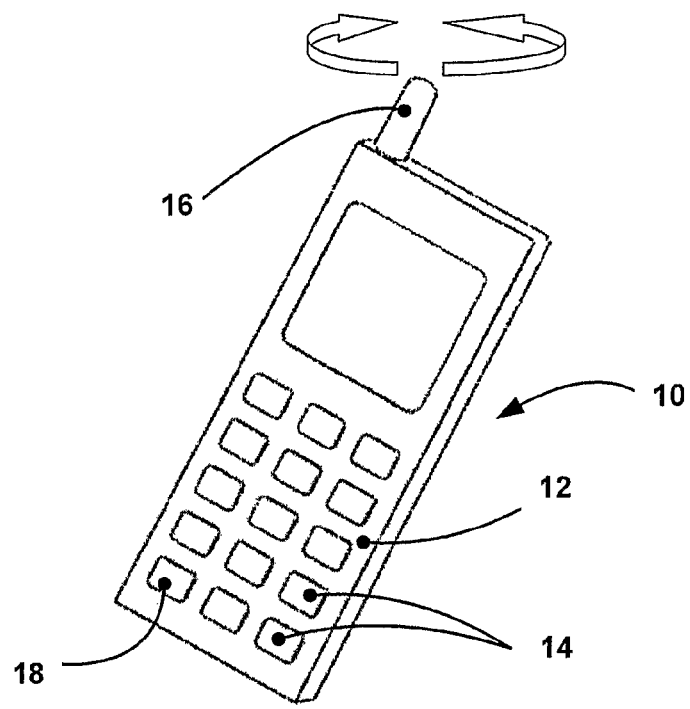

The mobile telephone of FIG. 13 has a rotatable aerial 16 (constituting a selector), which can be rotated as indicated by the arrows to make a selection. In addition, a detector (not shown) detects a selection made in accordance with the position of the aerial.

Figure 14:
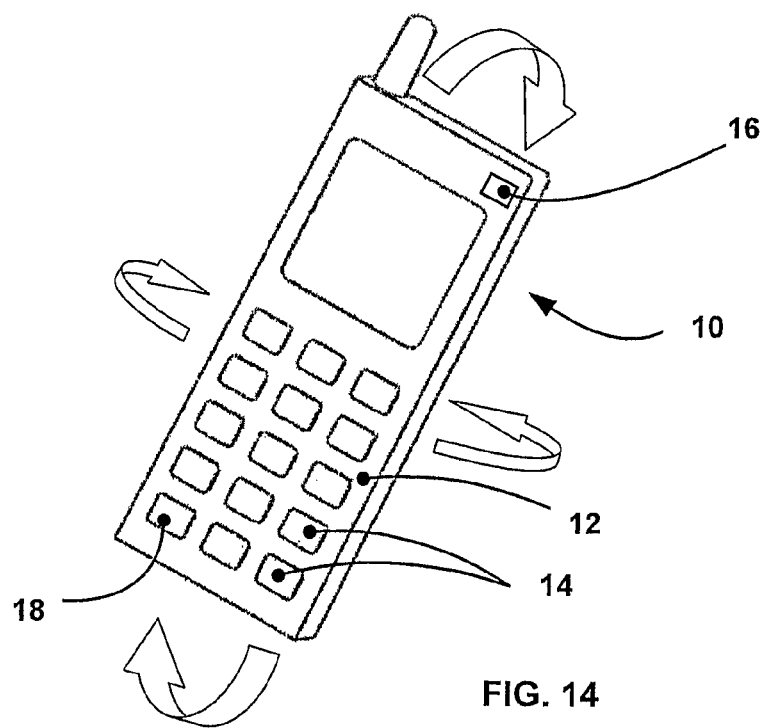

The mobile telephone of FIG. 14 has a tilt sensor 16 (constituting a selector), which is responsive to the orientation of the mobile telephone to thereby make a selection.

Figure 15:
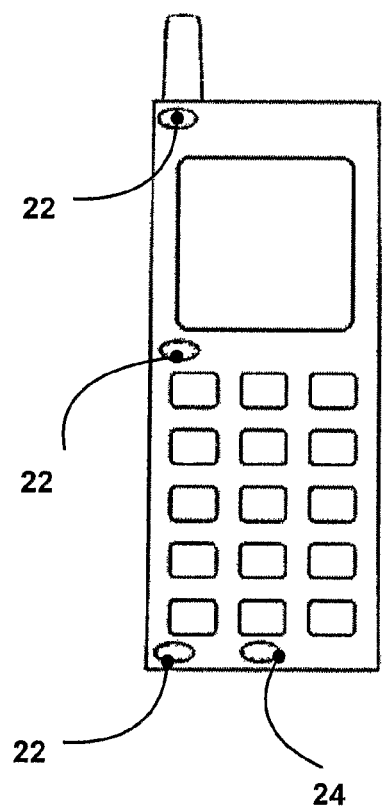

In the mobile telephone of FIG. 15, the selector is constituted by three panels 22 and a microphone 24. A user makes a selection by tapping one of the three panels. Tapping a panel causes it to vibrate in a predetermined manner, which in turn causes the emission of a characteristic tone. The tone is sensed by the microphone 24, which produces an electrical signal that effects the selection of a character.

Figure 16:
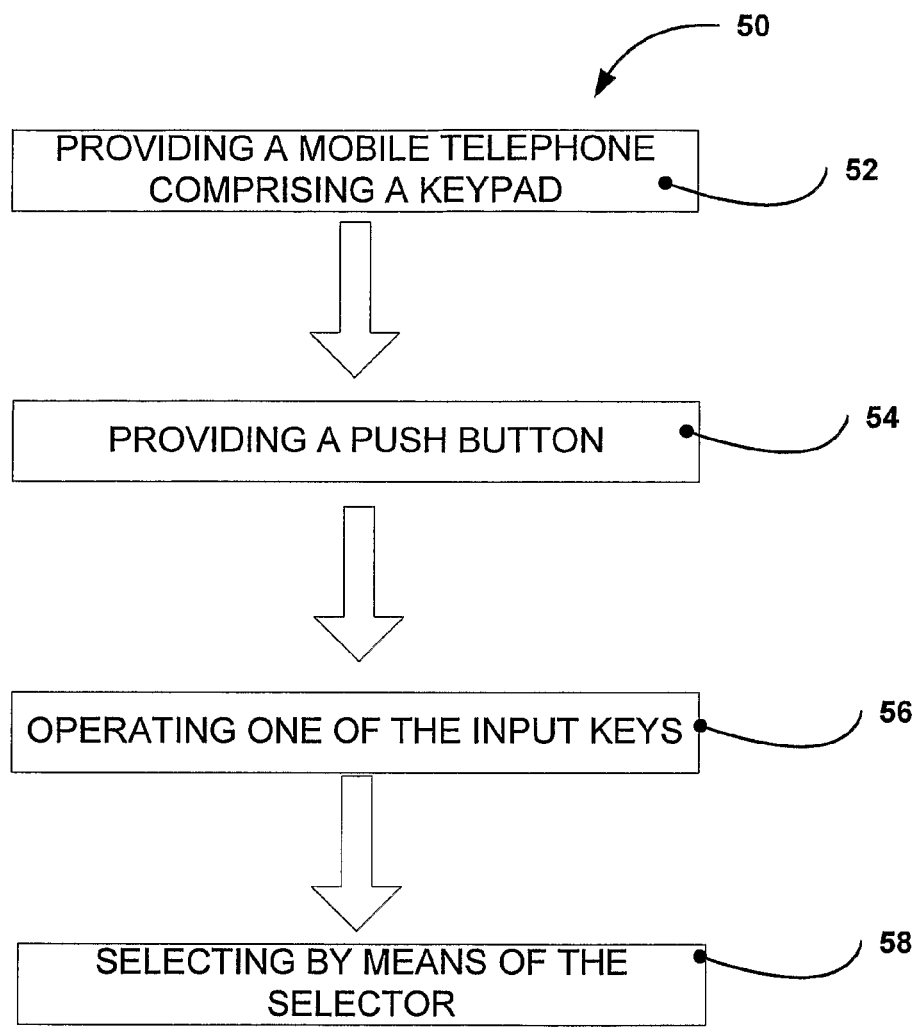
FIG. 16 is a method of selecting a character for entry into a mobile telephone according.

According to a mode of operation and with reference to both FIGS. 1 and 16 (and also to the embodiments shown in FIGS. 2 to 15), a mobile telephone user can compose a text message comprising different letters of the alphabet as described hereinafter. As can be seen from the mobile telephone 10 shown in FIG. 1, the number of keys provided on the keypad 12 is less than the number of letters in the alphabet. Consequently at least one key on the keypad is configured for entry of one of two or more different letters of the alphabet, e.g. one of 'w', 'x', 'y' and 'z'. According to the mode of operation 50, a mobile telephone comprising a keypad and a pushbutton (constituting a selector) is provided 52, 54. The user selects by means of the pushbutton 16, 58 one of the two or more different letters, i.e. one of 'w', 'x', y and 'z'. After, during or before making the selection, the user enters the selected letter by operating the appropriate key 56, 18 on the keypad 12 (which constitutes operating one of the input keys to enter one of two or more different letters). The input keys and pushbutton are configured for operation by dissimilar physical actions. The user operates the pushbutton by pressing it with his or her finger and operates the input key by touching it with his or her finger.

Figure 17A:
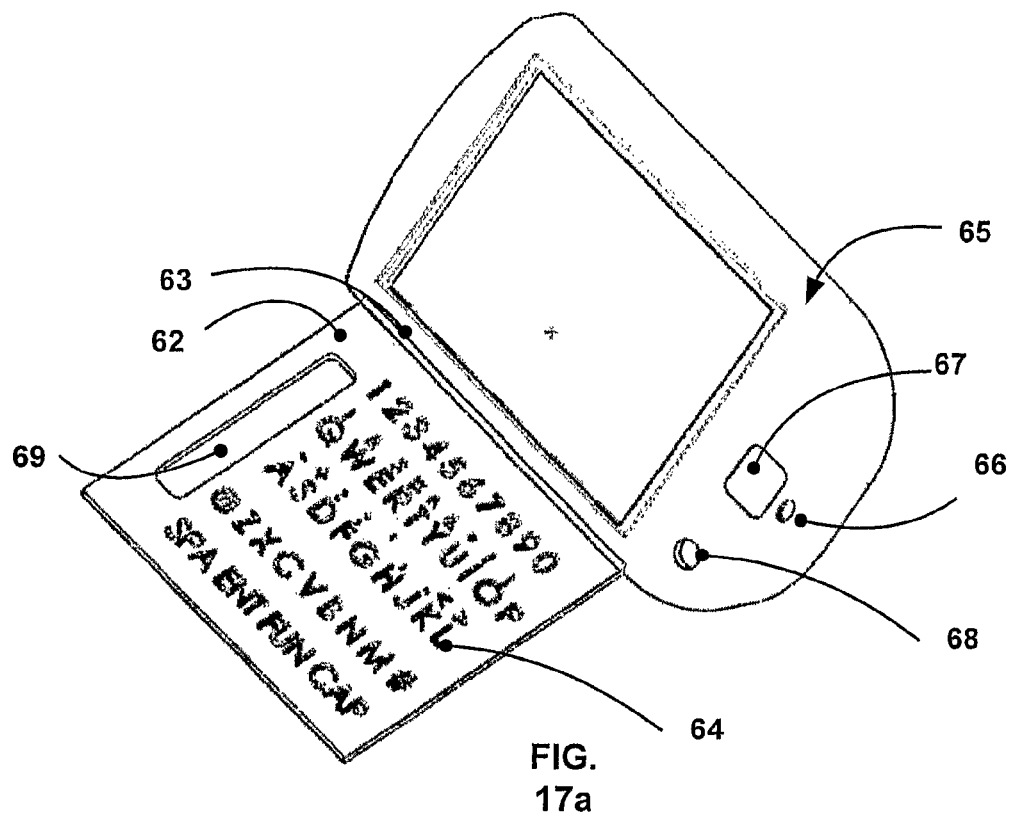
FIGS. 17a and 17b shows an embodiment of a handheld device.

The mobile telephone of FIG. 17*a* has a keypad 62, hinged to the main body 65 through hinge 63, comprising a plurality of input keys 64, each of which is operable to enter a letter of the alphabet, a character or a command. Each of the input keys is configured to vibrate in a predetermined and different manner corresponding to one of the letters of the alphabet, characters or commands when it is tapped by a user. The vibration causes the emission of a tone having a characteristic corresponding to the manner of vibration. The characteristic tone is detected by a microphone 66, either housed within the main body 65 or within the keypad 62, which produces a signal that is representative of the letter of the alphabet, character or command. The processor then finds a match of the signal within the database of input key signals corresponding to the letter, character or command associated with the tapped key and for instance displays the character on the screen and or executes the command. To increase the battery life it is desirable to switch off both the microphone tone detection and the associated processor signal recognition, when input through the keypad is not required. This can be achieved for instance by providing button 67 with the function of enabling and disabling both the microphone tone detection and the processor signal recognition as needed. Alternatively the disabling action can take place automatically after a predetermined period of absence of tone detection. Another method for enabling both the microphone tone detection and the processor signal recognition is to provide an accelerometer 68 and use the vibrations associated with the tapping of the keypad to generate a signal in the accelerometer which in turn can be used to enable the tone detection and recognition processes.

Figure 17B:
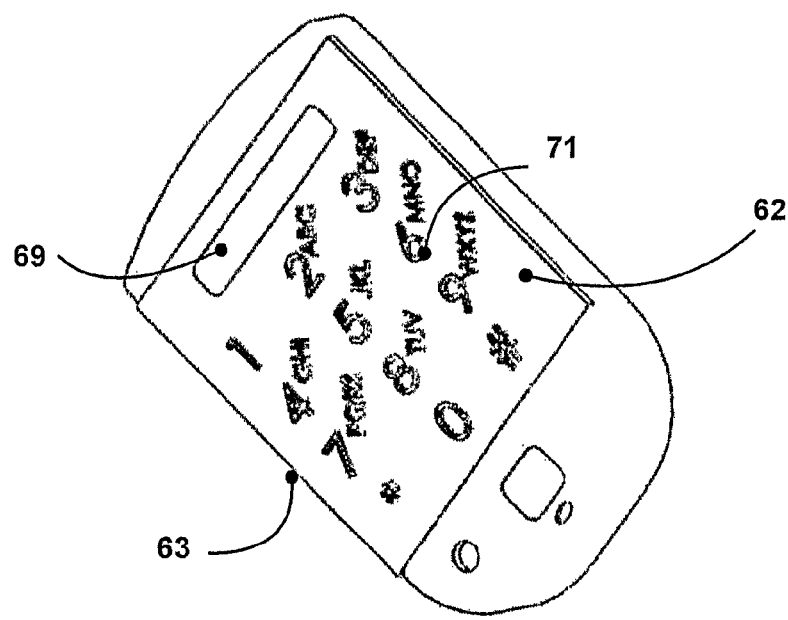

FIG. 17*b* shows the same mobile phone depicted, in FIG. 17*a* with keypad 62 in the close position acting as a display screen protector. This side of Keypad 62 is provided with keys 71 in a conventional twelve key layout with additional three or four letters for some of the keys for multi-tapping type of input. Keypad 62 is also provided with a see-through area 69 enabling the user to see a portion of the screen underneath which for instance could display the details of an incoming call or message.

A disadvantage of using an acoustic sensor such as a microphone may be that another party can eavesdrop on the user as he enters data. To address this problem, the input key or keys can be configured (either during manufacture or by the user during an initialization procedure) so that there is an unpredictable correlation between the tones emitted when an input key is struck and the characters the input keys represent. One simple way of implementing this capability would be to manufacture the devices with blank keys and provide the user with a set of sticky labels, each label identifying different characters, thereby allowing the user to determine which key represents which character. The device could then be programmed by the user during an initialization procedure to identify each key appropriately.

It will be appreciated that the mobile telephone of FIGS. 17*a* and 17*b* may be used in combination with any of the previous embodiments to give a full range keypad having fewer keys than alphanumeric characters.

Figure 18A:
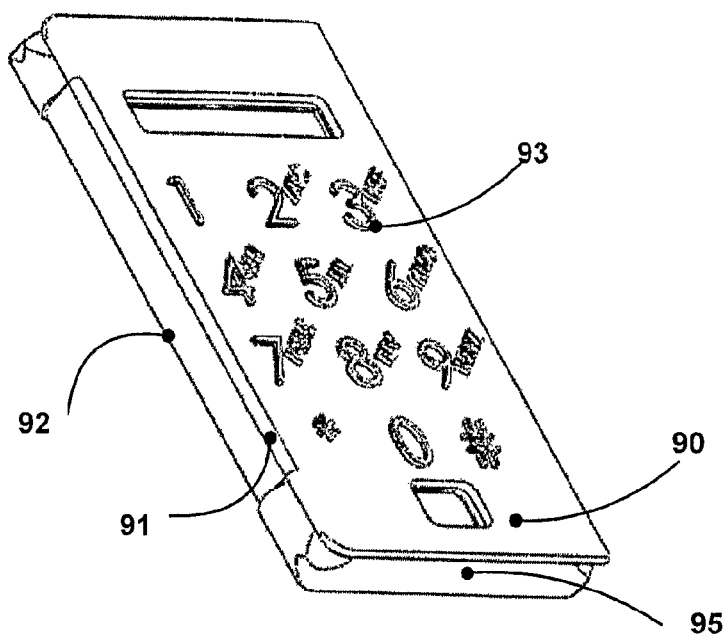
FIGS. 18a, 18b, 18c, 18d show an embodiment of a handheld device.
Figure 18B:
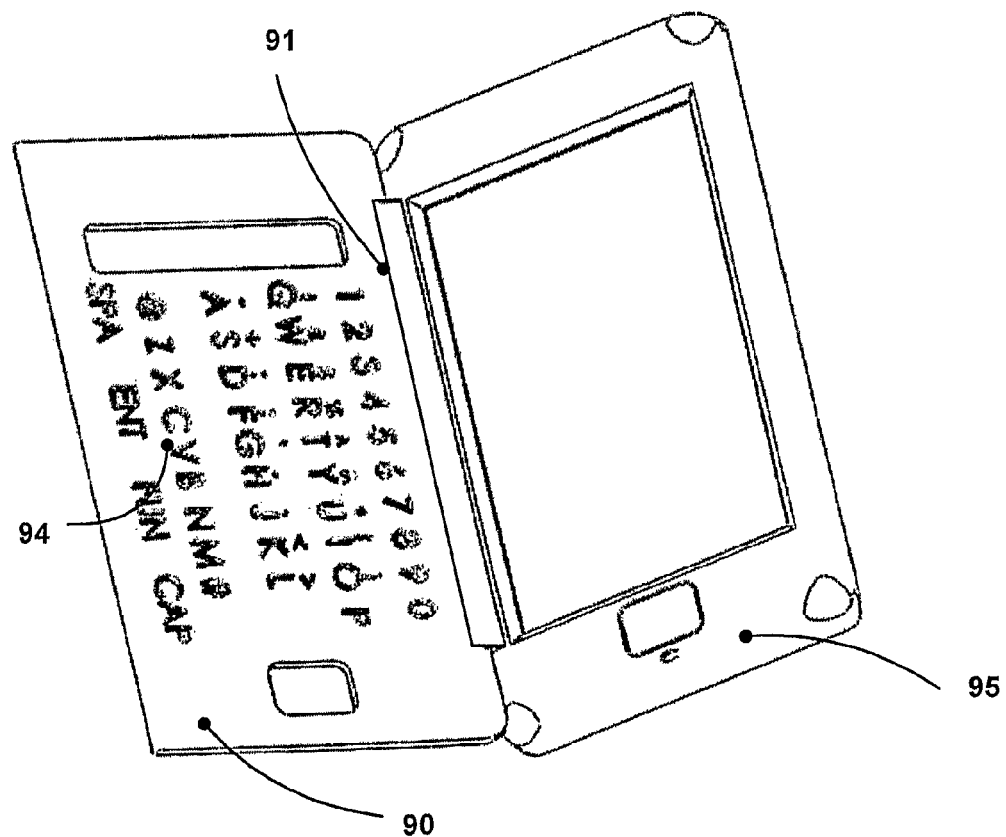
Figure 18C:
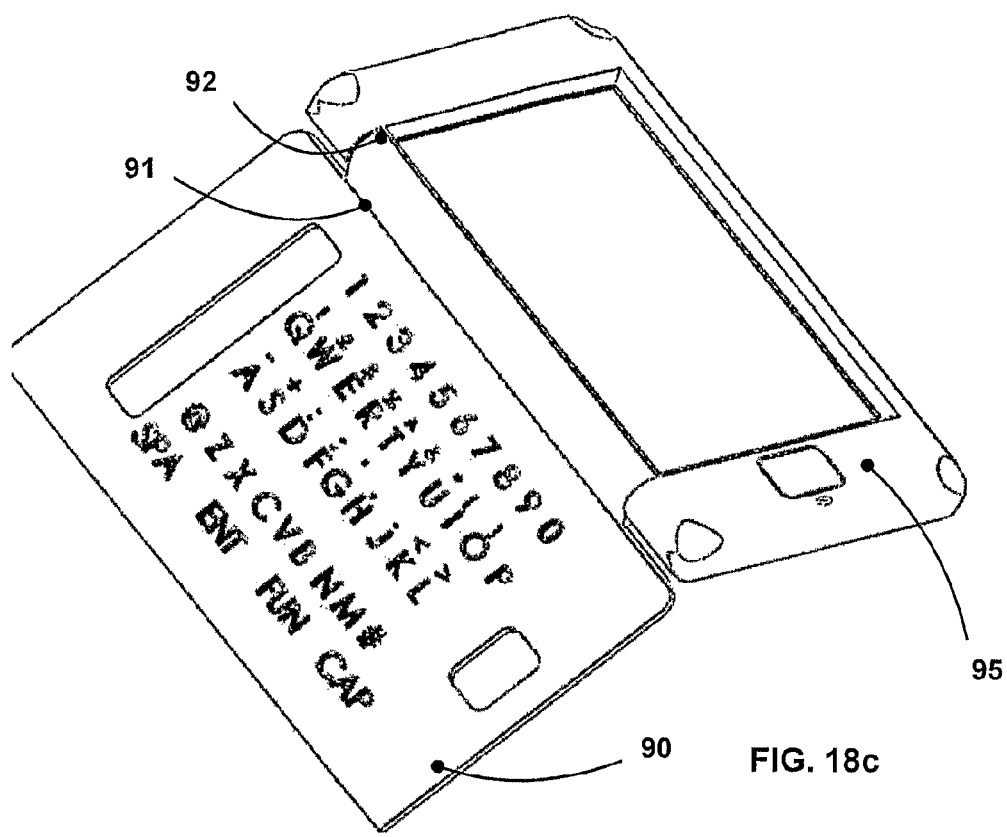
Figure 18D:
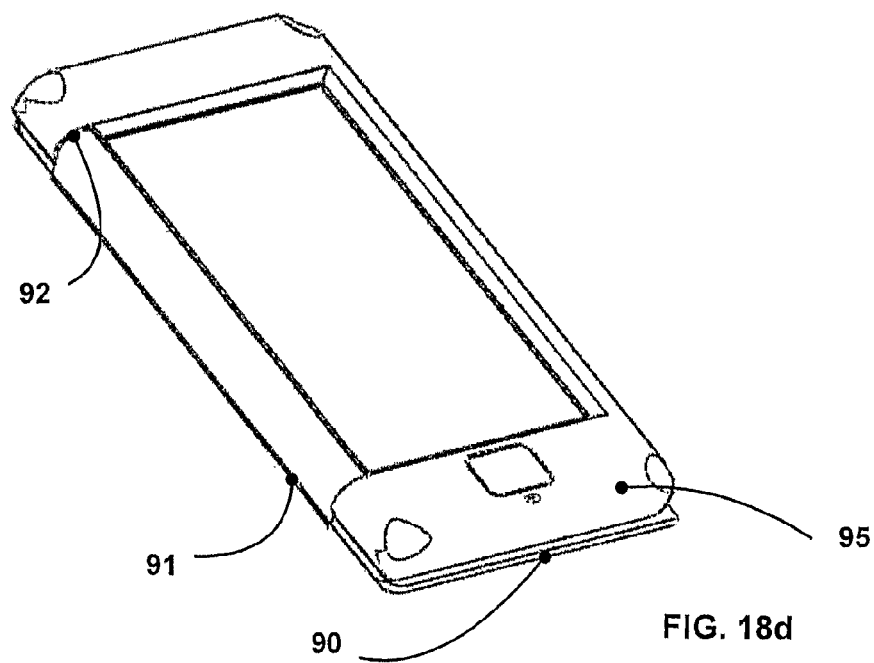

The mobile phone of FIGS. 18*a* to 18*d* is provided with a hinge mechanism which allows the keypad 90 to be positioned in three position relatively to body 95: closed over the screen with the twelve key layout 93 available when the phone is only used to receive and make calls or compose short messages; open to allow the use of the QWERTY layout 94 when more extensive text input is required; and completely folded underneath body 95 to reduce the bulk when for instance the user is mostly using the mobile phone as display device for media content such as pictures, movies and or internet screenshots. FIG. 18*a* shows keypad 90 hinged to body 95 through hinges 91 and 92 in a closed position protecting the screen and making available for input the twelve key layout 93. FIG. 18*b* shows keypad 90 in an open position allowing the use of the QWERTY layout 94 on the opposite face of twelve key layout 93, after having rotated around hinge mechanism 91 relatively to hinge 92 which remains in a fixed position relatively to body 95. FIG. 18*c* shows keypad 90 in a position where hinge 91 is fully rotated relatively to hinge 92 which in turn is partially rotated relatively to body 95. FIG. 18*d* shows keypad 90 out of the way with the twelve key layout 93 facing the underside of body 95 as hinge 91 is fully rotated relatively, to hinge 92 and hinge 92 is fully rotated relatively to body 95 to provide a full circle rotation and translation of keypad 90 relatively to body 95.

Figure 19A:
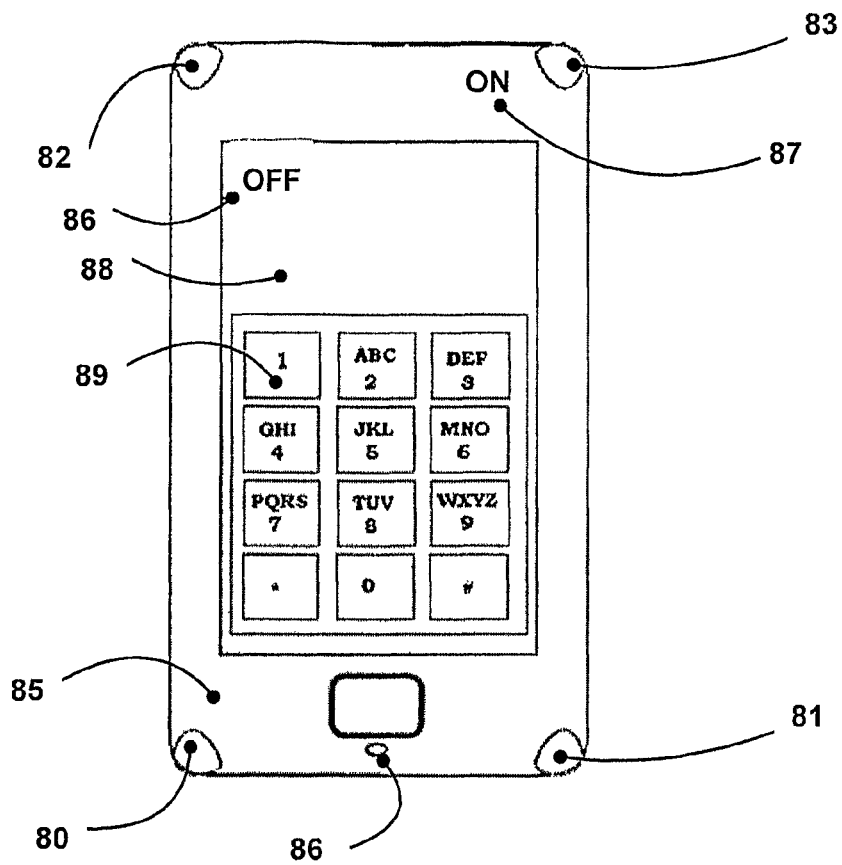
FIGS. 19a and 19b shows an embodiment of a handheld device.

In the mobile phone of FIG. 19*a*, as an example, four different areas 80, 81, 82 and 83 on the four corners of body 85, when struck by a user, produce either inherently, due to differences in the internal layout of the mobile phone, or by design, due to implementation of design features such as for instance a varying thickness casework, different tones and or different vibrations which can be detected by sensor 86 and subsequently recognized by the processor as representative of a particular command in accordance to factory or user customization settings. For instance in a web browsing application areas 80, 81, 82 and 83, when struck by the user, might be set or customised to execute the "Page up", "Page down", "Zoom-in" and "Zoom-out" commands respectively. Or alternatively, for example, one single tap of area 80 might execute the "Page up" command and two taps in quick succession of the same area 80 might execute the "Page down" command thus freeing for instance corner 81 to execute the, "Move left" command with a single tap and the "Move right" command with a double tap. The function of the input area can be either displayed on the screen in the vicinity of the area itself (also known as "Soft Key" because the function of the key may vary depending on the application) or marked on the casework. For instance the function of input area 82 is shown as an OFF function by label 86 on the screen whereas the function of input area 83 is marked permanently by label 87.

Alternatively different areas on the screen 88 such as area 89, when struck by the user, produce either inherently or by design, different tones and or different vibrations which can be detected by sensor 86 and subsequently recognized by the processor as representative of a particular command in accordance to factory or user customization settings.

Figure 19B:
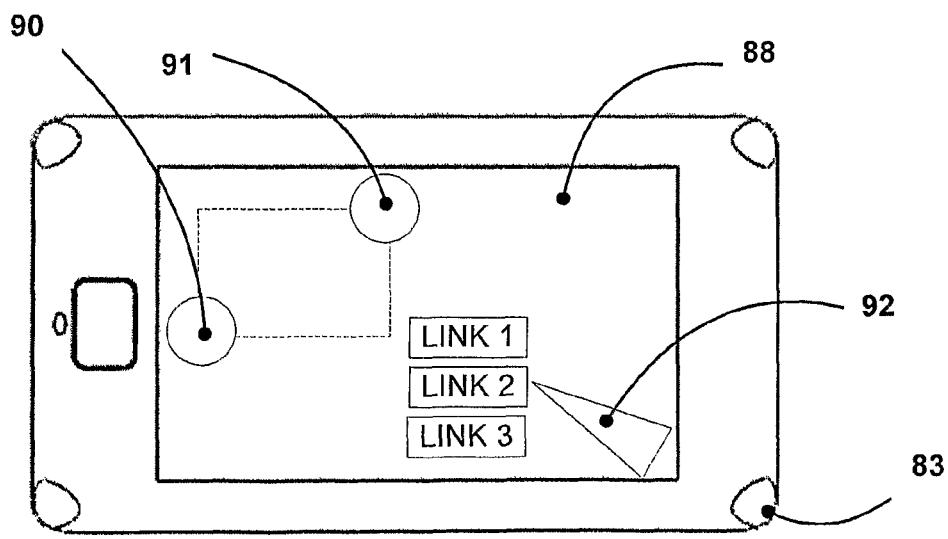

In the mobile phone of FIG. 19*b* the feature of concurrent tapping with two or more fingers on screen 88 is shown where for instance the user in a web browsing application can zoom in by tapping with the thumb in area 90 and the index finger in area 91, the combined tone detected by the sensor and subsequently recognized by the processor as representative of that particular area of the screen requiring enlargement. Also shown on the screen the leader feature allowing the user for instance to select hyperlinks not in the immediate vicinity of a input area 83 thanks to a leader 92 displayed on the screen by the mobile phone handset user interface, the user being able for instance to cycle through the links by single tapping on input area 83 and selecting the appropriate link by double tapping on the same area.

Figure 20:
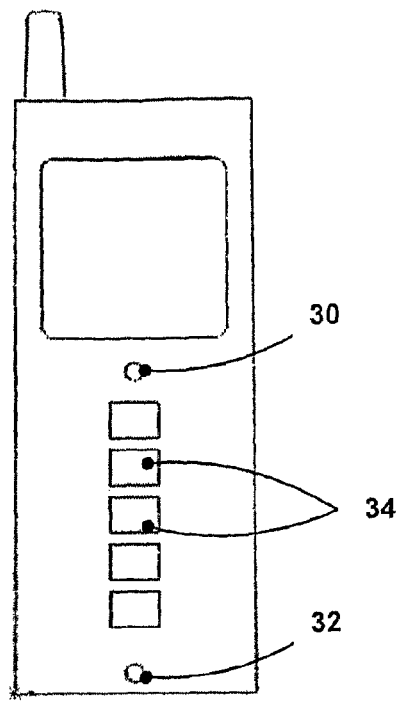
FIG. 20 shows another embodiment of a handheld device.

FIG. 20 shows a mobile phone having a keypad comprising a plurality of input keys 34, each of which vibrates to produce a tone when struck by the user, first and second microphones 30, 32 which sense when one of the input keys has been struck, and a processor (not shown). The input keys are positioned so as to form a single line of keys, and the microphones are positioned at either end of this line of keys. Each of the input keys represents a different character to be entered by the user. When one of the input keys is struck by the user, the emitted tone is received by the first and second microphones. By comparing the time delay between the first microphone 30 receiving the tone and the second microphone 32 receiving the tone, e.g. by means of a timer, the processor identifies which of the plurality of input keys has been struck.

It is to be appreciated that the mobile telephone, method and other features described with reference to the embodiments discussed above can be combined in other embodiments of the present invention.

Figure 21:
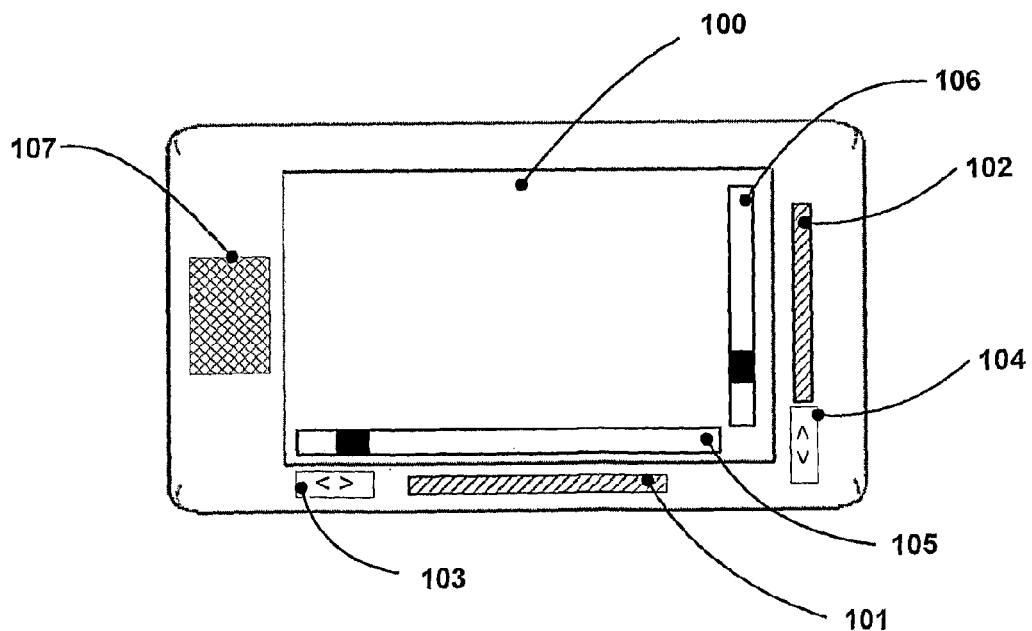
FIG. 21 is a 3D view showing a handheld device.

In the handheld device of FIG. 21, as an example, strips for detecting continuous finger, stylus or other implement sliding movement gestures 101 and 102 are located next to the display area 100. The function performed by these strips can be identified either with markings on the casework 103 and 104 or with relevant tags displayed on the screen 105, 106. The handheld device is also provided with pad 107 for detecting continuous finger, stylus or other implement sliding movement gestures along any direction and moving accordingly the pointer on screen 100 or scrolling the screen content along any direction.

As will be appreciated by the reader the above embodiments have described a general method whereby the location of a tap or strike on a handheld device can be detected by the detection and processing of the vibration caused by that tap or strike. For example, a conventional handheld device may be provided to which modified software or processing capability can be added. When a user taps or strikes the handheld device the processing capability detects the vibrations caused by that tap or strike (for example using the existing microphone) and determines the location of the tap or strike. Certain functions can then be implemented dependent on the determined location. The system may be calibrated for different types of tap or strike by requesting the user to tap the handheld device in certain locations.

The improved processing capability may be provided with the device or may be provided as an upgrade or addition at a later date. Such provision allows the addition of touch-screen style functionality to handheld devices for with a minimum extra cost.

The handheld device may be configured to detect taps or strikes anywhere on the device or only in limited locations. The possible locations may depend on the type and design of the handheld device, or on the processing capability of the device.

The detection and processing of taps or strikes may be performed according to conventional signal processing techniques tailored to the particular environment in which they are utilized.

The existing microphone in the handheld device may not be particularly suitable for this application and so further or alternative sensors may be provided to detect the taps or strikes.

The locations which may be struck by the user may be indicated on the body of the device, or may not be and may be selected by the user during configuration. Those locations may not be restricted to the front of the device but may be anywhere on the device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of preferred embodiments is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention. The term handheld device is used herein to refer to any device with processing capability such that it can execute instructions. Those skilled in the art will realize that such processing capabilities are incorporated into many different devices and therefore the term handheld device includes mobile telephones, personal digital assistants and many other devices.

The terms 'tap' and 'strike' are not intended to convey any particular attributes of the action described by those words, but are used in the general sense of making contact with the device. Furthermore, the tapping or striking may be performed using a finger, hand, or any other item suitable for making contact with a device.

The invention claimed is:

1. An electronic device, comprising
a processing system;
a sensor for detecting vibrations caused by a user striking the device and outputting a signal indicative of a parameter of those vibrations; wherein
the processing system is configured to analyse the signal output from the sensor and detect a location of the strike, wherein the detected location of the strike is utilised by the device to select a function to perform;
wherein the device is a mobile phone handset comprising at least one keypad and one display screen;
wherein the sensor is a microphone provided primarily to detect sound from a user speaking;
wherein the signal indicative of a parameter of the vibrations is a signal describing the pattern of vibrations;
wherein one or more input keys or areas are located on the display screen, the edges of the handset, the keypad, the keypad buttons or other surfaces of the apparatus, operable by a user to enter a character or command; and
wherein each input area produces a unique acoustic signature when struck by the user characteristic of said input area due to an asymmetric internal layout of the handset internal components or to variation in design features of the input areas,
wherein said mobile phone is configured to use said microphone for picking up the acoustic signature of an input area struck by the user; and
wherein said processing system is configured to:
process said unique acoustic signature to detect said location of said strike using a stochastic process model defined by statistical parameter data comprising a set of statistical parameters representing signals from each of a plurality of different locations of said strike on said mobile phone handset; and to:
input signal data from said sensor for a single said strike on the surface of said mobile phone;
express characteristics of said signal data using said stochastic process model defined by said statistical parameter data to determine for each of said different locations a probability that said single said strike is in said location; and
determine a probable closest match of data from said sensor for said single said strike to a said location to determine the location of said single said strike;
wherein said processing system is able to identify said location of a single said strike from said unique acoustic signature due to said asymmetric internal layout of said handset internal components.

2. The electronic device according to claim 1, wherein the determination of the area struck by the user utilizes a stochastic process model having different parameters for different tapping positions and different styles of tapping, where the model uses templates learned from training data from the mobile phone handset and the classification of the signal takes place according to which, if any, of the templates is a closest match.

3. The electronic device according to claim 2, wherein said classification is configured to use multi-class matched filtering.

4. The electronic device according to claim 1, wherein said process to detect said location of said strike comprises a feature extraction process to extract features of said signal and a classification process to classify said features.

5. The electronic device according to claim 1, wherein the determination of location comprises providing compensation for different striking implements.

6. The electronic device according to claim 1, wherein color coded input areas are provided on the exterior of the device which enable the quick selection of items.

7. The electronic device according to claim 1, wherein the user is able to select areas or implement commands on a display screen by striking two or more input areas at the same time.

8. The electronic device according to claim 7, wherein the command is a zooming in command triggered by striking at the same time with two fingers or implements the opposite corner of a particular area of the display screen.

9. The electronic device according to claim 1, wherein the user is able to manually calibrate or to initiate a semi-automatic calibration procedure of the input areas in case of reduction of the reliability of the recognition process.

10. The electronic device according to claim 1, further comprising at least one predefined input area operable by a user to input information to the device;
    and in which the input area is operable to enter one of two or more different characters by striking the area in one of two or more different ways.

11. The electronic device according to claim 1, wherein said processing system is further configured to identify a sliding or rotating action by said user on said mobile phone handset.

12. A method of detecting user input to an electronic device, comprising detecting vibrations caused by a user striking an area of the device, determining the area struck by the user from a parameter of the vibrations, and executing a command in response to the detection, wherein the command is selected dependent on the detected location, wherein each input area of a plurality of areas each input area produces a unique acoustic signature when struck by the user characteristic of said input area (80-83, 89) due to an asymmetric internal layout of the electronic device internal components or to variation in design features of the input areas, and
    wherein the method comprises processing said unique acoustic signature to detect said location of said strike using a stochastic process model defined by statistical parameter data comprising a set of statistical parameters representing signals from each of a plurality of different locations of said strike on said mobile phone handset;
    wherein said processing comprises:
    inputting signal data from said sensor for a single said strike on the surface of said mobile phone;
    expressing characteristics of said signal data using said stochastic process model defined by said statistical parameter data to determine for each of said different locations a probability that said single said strike is in said location; and
    determining a probable closest match of data from said sensor for said single said strike to a said location to determine the location of said single said strike;
    wherein said processing is able to identify said location of a single said strike from said unique acoustic signature due to said asymmetric internal layout of said handset internal components.

13. The method as claimed in claim 12, wherein said processing comprises either
    i) using a stochastic process model having different parameters for different tapping positions and different styles of tapping, where the model is based on templates learned from training data from the electronic device and the classification of the signal takes place according to which, if any, of the templates is a closest match; or
    ii) performing a feature extraction process followed by a classification process.

14. The method as claimed in claim 12 used for upgrading a mobile phone handset to add touch-screen functionality using an existing microphone of the mobile phone handset, the method comprising adding processing capability to implement the method of claim 12.

15. A non-transitory machine readable storage medium storing instructions, which when executed by a computing device implement the method of claim 12.

16. An electronic device, comprising
    a processing system;
    a sensor for detecting vibrations caused by a user striking the device and outputting a signal indicative of a parameter of those vibrations; wherein
    the processing system is configured to analyse the signal output from the sensor and detect a location of the strike,
    wherein the detected location of the strike is utilised by the device to select a function to perform;
    wherein the device is a mobile phone handset comprising at least one keypad and one display screen;
    wherein the sensor is a microphone provided primarily to detect sound from a user speaking;
    wherein the signal indicative of a parameter of the vibrations is a signal describing the pattern of vibrations;
    wherein one or more input keys or areas are located on the display screen, the edges of the handset, the keypad, the keypad buttons or other surfaces of the apparatus, operable by a user to enter a character or command; and
    wherein each input area produces a unique acoustic signature when struck by the user characteristic of said input area due to an asymmetric internal layout of the handset internal components or to variation in design features of the input areas,
    wherein said mobile phone is configured to use said microphone for picking up the acoustic signature of an input area struck by the user;
    wherein said mobile phone handset is configured to process said unique acoustic signature to detect said location of said strike; and
    wherein said processing system is configured to:
    capture training data representing signals from said sensor for a plurality of different said training locations of said strike on said mobile phone handset;
    process said training data to determine statistical parameter data for said different locations of said strike, said statistical parameter data comprising a set of statistical parameters derived from signals from each of said plurality of said different said locations, wherein said set of statistical parameters defines a stochastic process model;
    input signal data from said sensor for a single said strike on the surface of said mobile phone;
    express characteristics of said signal data using said stochastic process model defined by said statistical parameter data to determine for said training locations a probability that said single said strike is in said training location; and determine a probable closest match of data from said sensor for said single said strike to a said training location to determine said location of said single said strike;

wherein said processing system is able to identify said location of a single said strike from said unique acoustic signature due to said asymmetric internal layout of said handset internal components.

* * * * *